United States Patent [19]

Okinaka et al.

[11] Patent Number: 5,531,922
[45] Date of Patent: Jul. 2, 1996

[54] GRANULATED PARTICLES FOR MAGNETIC PARTICLES FOR MAGNETIC RECORDING, AND PROCESS FOR PRODUCING THE SAME

[75] Inventors: Kenji Okinaka; Yasutaka Ota; Kohji Mori, all of Hiroshima; Hirofumi Kawasaki, Hiroshima-ken; Masayuki Uegami, Onoda; Akio Mishima; Katsumi Yamashita, both of Hiroshima; Minoru Yamasaki, Ohtake; Manabu Matsumoto, Hiroshima; Kunihiro Kouchi, Hiroshima; Hiroki Kamon, Hiroshima, all of Japan

[73] Assignee: Toda Kogyo Corporation, Hiroshima-ken, Japan

[21] Appl. No.: 527,017

[22] Filed: Sep. 12, 1995

Related U.S. Application Data

[63] Continuation of Ser. No. 98,001, Jul. 29, 1993, abandoned.

[30] Foreign Application Priority Data

Aug. 4, 1992 [JP] Japan .................. 4-229213
Sep. 30, 1992 [JP] Japan .................. 4-286604

[51] Int. Cl.$^6$ ............................................. C01G 49/02
[52] U.S. Cl. ............................... 252/62.56; 252/62.58; 252/62.59; 252/62.62; 423/632; 75/255; 148/297; 148/514; 148/306

[58] Field of Search ................... 252/62.58, 62.59, 252/62.62, 62.56; 423/632; 75/255; 148/287, 514, 306

[56] References Cited

FOREIGN PATENT DOCUMENTS

| 55-82408 | 6/1980 | Japan . |
|---|---|---|
| 57-54205 | 3/1982 | Japan . |
| 57-116706 | 7/1982 | Japan . |
| 63-88807 | 4/1988 | Japan . |
| 2026998 | 2/1980 | United Kingdom . |

OTHER PUBLICATIONS

Derwent Abstract J55082408.
Derwent Abstract JP60080128 A 850508 DW8525.

*Primary Examiner*—Melissa Bonner
*Attorney, Agent, or Firm*—Nixon & Vanderhye

[57] ABSTRACT

Disclosed herein are granulated particles for magnetic particles for magnetic recording, comprising: acicular ferric hydroxide oxide particles or acicular iron oxide particles; and at least one selected from the group consisting of semisynthetic starch and semisynthetic cellulose and having a bulk density of not less than 0.3 g/cm$^3$ and a powdering ratio of not more than 40%, and a process for producing the granulated particles, and magnetic particles obtained from such granulated particles.

20 Claims, No Drawings

GRANULATED PARTICLES FOR MAGNETIC PARTICLES FOR MAGNETIC RECORDING, AND PROCESS FOR PRODUCING THE SAME

This is a continuation of application Ser. No. 08/098,001, filed Jul. 29, 1993, now abandoned.

BACKGROUND OF THE INVENTION

The present invention relates to granulated particles suitable as a raw material for magnetic particles for magnetic recording and a process for producing the granulated particles.

Miniaturized and lightweight video or audio magnetic recording and reproducing apparatuses for long-time recording have recently shown a remarkable progress. Especially, video tape recorders (VTR) have conspicuously spread and the development of miniaturized and lightweight VTR's for longer-time recording have been conducted.

With this development, magnetic recording media such as a magnetic tape and magnetic disk have been strongly required to have a higher performance such as a higher recording density, a higher sensitivity and higher output characteristics. In order to satisfy the above-described demands on magnetic recording media, the magnetic particles are required to have a high coercive force and the distribution of the coercive force among particles must be as narrow as possible. Namely, in order to achieve a higher sensitivity and higher output characteristics, it is required that the magnetic particles have a higher coercive force. This fact is described in, for example, *Development of Magnetic Materials and Technique for High Dispersion of Magnetic Powder*, published by Kabushiki Kaisha Sogo Gijutsu Center (1982) on page 310, "Since the development of the performance of a magnetic tape is aimed at a higher sensitivity, a higher output . . . , it is an important point to enhance the coercive force . . . of acicular $\gamma$-$Fe_2O_3$"

In order to enhance the output of a magnetic recording medium, it is necessary that S.F.D.(Switching Field Distribution) value is small, as seen from the description in Japanese Patent Application Laid-Open (KOKAI) No. 63-26821 (1988): "FIG. 1 shows the relationship between the S.F.D value and the recording and reproducing output of the magnetic disc . . . The relationship between the S.F.D value and the recording and reproducing output is linear, as is obvious from FIG. 1, which proves that the use of ferromagnetic particles having a small S.F.D. value enhances the recording and reproducing output. That is, in order to increase the recording and reproducing output, the S.F.D. value is preferably as small as possible. In order to obtain a higher output more than the ordinary one, it is necessary that the S.F.D. value is not more than 0.6." In order to have a small S.F.D. value the distribution thereof among particles is required to be narrow.

As well known, the coercive force of magnetic particles largely depends upon the shape anisotropy, crystalline anisotropy, strain anisotropy or exchange thereof.

Magnetic iron oxide particles such as acicular magnetite ($FeOx \cdot Fe_2O_3$, $0 \leq x < 1$) particles and acicular maghemite particles, and acicular magnetic iron based alloy particles which are used as magnetic particles for magnetic recording have a comparatively high coercive force by utilizing the anisotropy derived from the shape of each particle.

These known magnetic iron oxide particles are produced by reducing as a raw materials acicular goethite particles or acicular hematite particles obtained by heating and dehydrating acicular goethite particles, in a reducing gas such as hydrogen so as to produce acicular magnetite particles, or further oxidizing the acicular magnetite particles in air so as to produce acicular maghemite particles.

The known Co-modified, or Co and $Fe_{2+}$-modified acicular magnetic iron oxide particles are obtained by dispersing acicular magnetite particles or acicular maghemite particles as the precursor particles in an alkali suspension containing cobalt hydroxide or an alkali suspension containing cobalt hydroxide and ferrous hydroxide, and heat-treating the dispersion.

The most important process for influencing various properties of the magnetic iron oxide particles obtained is a heat-treatment process. As the heat-treating apparatus used in the heat-treatment process, a rotary furnace for heat-treating the raw material while rotating it and a fluidized-bed furnace for heat-treating the raw material while fluidizing it, are known.

Also, magnetic iron based alloy particles are obtained by using, as the raw material, acicular goethite particles, acicular hematite particles obtained by dehydrating acicular goethite particles at a temperature of 150° to 280° C. or acicular hematite particles having a high density obtained by heating acicular goethite particles to 300° to 850° C. in a non-reducing atmosphere, heat-treating these particles in a stream of a reducing gas such as hydrogen gas and then subjecting the obtained particles to surface-oxidizing treatment. The most important process for influencing various properties of the magnetic iron based alloy particles obtained is a process of heat-treating a raw material particles. As the heat-treating apparatus, a rotary reducing apparatus for the raw material particles while rotating, a fluidized-bed reducing apparatus for heat-treating the raw material particles while fluidizing, and a fixed-bed reducing apparatus for heat-treating the raw material particles in a fixed state, etc. are known.

When magnetic particles are produced by heat-treating acicular goethite particles or acicular hematite particles as the raw material in a rotary furnace or fluidized furnace, or a rotary reducing apparatus or fluidized-bed reducing apparatus, respectively, the reaction thereof proceeds uniformly, because the rotation or fluidization of the raw material particles makes the heat-treating or reducing atmosphere uniform. However, since collision or friction is caused between the raw material particles or between the raw material particles and the wall of the reactor due to the rotation or flow of the raw material particles, sintering between the particles and the lost of shape of a particle are apt to be caused in the heat-treating process or heat-reducing process, so that the magnetic characteristics are deteriorated. On the other hand, in the case of using a fixed-bed reducing apparatus, since the raw material particles is reduced in an approximately static state, sintering between the particles and the lost of shape of particles which are caused by the collision or friction of the raw material particles due to rotation or fluidization are unlikely to be produced. In the case of heat-reducing the particles in a fixed-bed reducing apparatus, in this way, particles granulated in various means are used as the raw material in order to prevent the raw material particles from being fluidized against the flow of a gas stream.

Methods of producing magnetic iron based alloy particles by using a fixed-bed reducing apparatus are disclosed in Japanese Patent Publication Nos. 61-36048 (1986), 1-52441 (1989), 1-52442 (1989), 1-52443 (1989) and 1-52444

(1989), Japanese Patent Application Laid-Open (KOKAI) No. 54-62915 (1979), etc.

In case of heat-treating or heat-reducing acicular goethite particles or acicular hematite particles, it is necessary to use granulated particles which produce little fine powder due to the collision or friction between the raw material particles or between the raw material particles and the wall of the reactor.

As examples of a method of granulating the raw material in advance, a method of supplying finely pulverized $\alpha$-$Fe_2O_3$ particles and water sprinkled through a spray to a granulation a predetermined ratio to obtain granulated particles (Japanese Patent Application Laid-Open (KOKAI) No. 63-88807 (1988)), and a method of dispersing fine iron oxide particles in water, compressing and dehydrating the dispersion by a filter-press to a water content of 60 to 80 wt % so as to obtain pellets (Japanese Patent Application Laid-Open (KOKAI) Nos. 57-54205 (1982) and 57-116706 (1982)) are known.

To state this more concretely, Japanese Patent Application Laid-Open (KOKAI) No. 57-54205 (1982) discloses a method of producing a magnetic metal fine powder containing iron as the main ingredient comprising the steps of: dispersing in water a metal compound powder containing iron as the main ingredient; compressing and dehydrating the resultant dispersion to a water content of 60 to 80 wt % so as to obtain pellets; and reducing the pellets at a temperature of 300° to 600° C. by a reducing gas such as hydrogen.

Japanese Patent Application Laid-Open (KOKAI) No. 57-116706 (1982) discloses a method of producing a magnetic metal powder comprising the steps of: coating the surfaces of metal compound particles containing iron oxyhydroxide or iron oxide as the main ingredient with a silicon compound; granulating the coated metal compound particles into pellets; and heat-treating the pellets in a reducing atmosphere.

As the means for granulating the metal compound particles coated with the silicon compound, a method of dispersing the particles in water, and compressing and dehydrating the dispersion by a filter-press to a water content of 60 to 80 wt % so as to obtain pellets; a method of adding water to the above-mentioned particles to a water content of 35 to 45 wt % kneading the mixture, and extruding the resultant mixture into masses by an extruder; a method of compacting the particles in a dried state by a compression of 200 to 1000 kg/cm$^2$ by a tablet machine into pellets, etc. are proposed in Japanese Patent Application Laid-Open (KOKAI) No. 57-116706(1982).

Japanese Patent Application Laid-Open (KOKAI) No. 63-88807(1988) discloses a method of producing a magnetic iron powder comprising the steps of: coating the surfaces of iron oxyhydroxide particles with a magnetism-adjusting component and/or shape-retaining component; heat-treating the coated particles in the reducing atmosphere; pulverizing the heat-treated particles; granulating the pulverized particles by using water as a binder; drying and reducing the granulated particles.

In any of the above-described are granulated by using water as a binder.

Industrially and economically advantageous production of magnetic particles having a high coercive force, a large saturation magnetization and narrow distribution of the coercive force and the saturation magnetization among particles is now in the strongest demand. However, if magnetic particles are produced by any of the above-described related art using the granulated particles produced by a rotary furnace, rotary reducing apparatus or fixed-bed reducing apparatus, the distribution of the coercive force and the saturation magnetization among the obtained particles become so wide that it is impossible to obtain magnetic particles which satisfy the above-described demand for various properties.

It is because the granulated particles which are likely to produce a fine powder are used as the raw material that the distribution of the coercive force and the saturation magnetization among the magnetic particles obtained become wide when the granulated particles are heat-treated in a rotary furnace or heat-reduced in a fixed-bed reducing apparatus.

Since water is used as a binder for producing the granulated particles in the art, the granulated particles have a low strength. Under the condition in which the linear speed of blowing gas such as oxidizing gas, reducing gas and inert gas is comparatively large at the time of heat-treating or heat-reducing so as to enhance the reducing and oxidizing efficiency or the reducing efficiency, it is often the case that fine powder is produced by friction between granulated particles having a low strength when weak vibration is applied thereto, and that fine powder is produced when the raw material is charged (transferred) into a heat-treating furnace or a fixed-bed reducing apparatus, or when the raw material is heated and expanded. In this way, when granulated particles having a low strength are used as the raw material and heat-treated in a rotary furnace or heat-reduced in a fixed-bed reducing apparatus, the fine powder produced is existent locally in the bed and the pressure loss at that portion becomes large, thereby producing a channel of the blowing gas, which makes the progress of reduction and oxidization or reduction of the particles non-uniform, thereby deteriorating the reducing and oxidizing efficiency or the reducing efficiency. As a result, the magnetic iron oxide particles obtained disadvantageously have a wide distribution of the magnetic properties (coercive force and saturation magnetization) among the particles.

On the other hand, a method of using an organic material as a reducing agent in the production of magnetic iron based alloy particles is proposed in Japanese Patent Application Laid-Open (KOKAI) No. 55-82408 (1980).

More specifically, Japanese Patent Application Laid-Open (KOKAI) No. 55-82408 (1980) discloses a method of producing an iron powder and an iron-cobalt alloy powder for a magnetic tape, the method comprising the steps of: preparing acicular iron oxide particles or cobalt-containing iron oxide particles as the raw material; adhering an organic material having adhesiveness to the surfaces of the particles of the raw material; and heating the resultant particles in a reducing gas, in a inert gas or in a vacuum so as to reduce the raw material with the organic material, thereby obtaining an iron powder or an iron-cobalt alloy powder retaining the acicular shape of the raw material.

As the preferred organic material is described therein an inexpensive organic material which decomposes at a low temperature and produces no corrosive gas such as cellulose acetate, ethyl cellulose, methyl cellulose, styrene, vinyl alcohol, vinyl acetate, starch and dextrin. In the above-described method, an organic material adheres to the surfaces of the particles of the raw material, and the amount thereof is 5 to 50 wt % based on the total amount of particles as the raw material.

As is obvious from the description in the Japanese Patent Application Laid-Open (KOKAI) No. 55-82408 (1980), of "In the method of the present invention, iron oxide powder is reduced into an iron powder by producing CO, $CO_2$ or $H_2O$ combining a carbon atom and a hydrogen atom, which are components of the organic material adhered to the surfaces of the iron oxide particles, with an oxygen atom of the iron oxide particles when heated . . . ", an organic material is used as a reducing agent.

Although Japanese Patent Application Laid-Open (KOKAI) No. 55-82408 (1980) discloses iron oxide particles coated with an organic material, it is silent on granulated iron oxide particles and a granulating method. In addition, since the method disclosed in Japanese Patent Application Laid-Open (KOKAI) No. 55-82408 (1980) is a method of using an organic material as a reducing agent, the object of the use of the organic material is completely different from that of the present invention, and there is no description which motivates the use of the compounds according to the present invention.

That is, it is required to provide magnetic particles for magnetic recording which have a high coercive force and as narrow distribution of the coercive force and the saturation magnetization among particles as possible.

As a result of various studies undertaken so as to achieve the above-described requirements, it has been found that by adding to a suspension composed of acicular ferric hydroxide oxide particles or acicular iron oxide particles and water, not less than 0.1 part by weight and less than 5.0 parts by weight of water- or hot water-soluble semisynthetic starch or semisynthetic cellulose based on 100 parts by weight of the particles in the suspension; stirring the resultant suspension; compressing and dehydrating the suspension to obtain a cake; and granulating the cake, the obtained granulated particles produces little fine powder even in the case of using a rotary furnace or a fixed-bed reducing apparatus and, hence, produces no channel of the blowing gas in the bed at the time of heat-treating or heat-reducing, thereby making the progress of reduction and oxidization or reduction of the granulated particles uniform, and as a result, such granulated particles are suitable as the raw material for magnetic particles for magnetic recording which have a high coercive force, a large saturation magnetization, and narrow distribution of the coercive force and the saturation magnetization among particles. The present invention has been achieved on the basis of this finding.

SUMMARY OF THE INVENTION

It is an object of the present invention to provide granulated particles for magnetic particles for magnetic recording, having a powdering ratio of not more than 40%.

It is another object of the present invention to provide granulated particles which produces little fine powder in the case of using a fixed-bed reducing apparatus and, hence, produces no channel of the blowing gas such as oxidizing gas, reducing gas and inert gas in the bed at the time of heat-treating, thereby making the progress of reduction of the granulated particles uniform, and which are suitable as the raw material for magnetic iron based alloy particles for magnetic recording which have a high coercive force, a large saturation magnetization, and narrow distribution of the coercive force and the saturation magnetization among particles.

It is still another object of the present invention to provide granulated particles which produces little fine powder in the case of using a rotary furnace and, hence, produces no channel of the blowing gas in the bed at the time of heat-treatment, thereby making the progress of reduction and if necessary, oxidization of the granulated particles uniform, and which are suitable as the raw material for magnetic iron oxide particles for magnetic recording which have a high coercive force, a large saturation magnetization, and narrow distribution of the coercive force and the saturation magnetization among particles.

In a first aspect of the present invention, there are provided granulated particles for magnetic particles for magnetic recording, comprising acicular ferric hydroxide oxide particles or acicular iron oxide particles; and at least one selected from the group consisting of semisynthetic starch and semisynthetic cellulose; and having a bulk density of not less than 0.3 $g/cm^3$ and a powdering ratio of not more than 40% as measured by the following method:

(1) 100 g of granulated particles having a diameter of more than 1 mm and 200 g of steel ball having a diameter of 12.5 mm are charged into a steel container having an inner diameter of 8.5 cm, a height of 8.5 cm and an inner volume of 482 $cm^3$, and the resultant mixture is stirred at a peripheral speed of 50 rpm for 1 hour;

(2) the weight of the granulated particles having a diameter of less than 1 mm in the steel container is measured; and (3) the powdering ratio is obtained from the following formula:

Powdering ratio (%) = (The weight of the granulated particles having a diameter of less than 1 mm)/ (The weight (100 g) of the granulated particles before measurement) × 100.

In a second aspect of the present invention, there are provided granulated particles for magnetic iron based alloy particles for magnetic recording, comprising acicular ferric hydroxide oxide particles or acicular iron oxide particles containing Al, Ni, Co, B, Zn, P and/or Si, and at least one selected from the group consisting of semisynthetic starch and semisynthetic cellulose; and having an average major axis diameter of 1 to 70 mm, an average minor axis diameter of 1 to 10 mm, an aspect ratio (average major axis diameter/ average minor axis diameter) of 1 to 7, a bulk density of not less than 0.5 $g/cm^3$ and a powdering ratio of not more than 40% as measured by the method as defined in the 1st aspect.

In a third aspect of the present invention, there are provided granulated particles for magnetic iron oxide particles for magnetic recording, comprising acicular ferric hydroxide oxide particles or acicular iron oxide particles and at least one selected from the group consisting of semisynthetic starch and semisynthetic cellulose; and having an average major axis diameter of 1 to 70 mm, an average minor axis diameter of 1 to 7 mm, an aspect ratio (average major axis diameter/average minor axis diameter) of 1 to 10, a bulk density of not less than 0.3 $g/cm^3$ and a powdering ratio of not more than 40% as measured by the method as defined in the 1st aspect.

In a fourth aspect of the present invention, there is provided a process for producing granulated particles for magnetic particles for magnetic recording, which comprise acicular ferric hydroxide oxide particles or acicular iron oxide particles, and at least one selected from the group consisting of semisynthetic starch and semisynthetic cellulose and which have a bulk density of not less than 0.3 $g/cm^3$ and a powdering ratio of not more than 40% as measured by the method as defined in the 1st aspect, the process comprising the steps of: adding to a suspension composed of acicular ferric hydroxide oxide particles or acicular iron oxide particles and water, not less than 0.1 part by weight and less than 5.0 parts by weight of at least one selected from the group consisting of semisynthetic starch and semisynthetic cellulose based on 100 parts by weight of the particles in the suspension; stirring the resultant suspension; compressing and dehydrating the suspension to obtain a cake; and granulating the cake.

In a fifth aspect of the present invention, there is provided magnetic iron based alloy particles for magnetic recording, obtained by heat-treating in a reducing gas the granulated particles which comprise acicular ferric hydroxide oxide particles or acicular iron oxide particles containing Al, Ni, Co, B, Zn, P and/or Si, and at least one selected from the group consisting of semisynthetic starch and semisynthetic cellulose and which have an average major axis diameter of 1 to 70 mm, an average minor axis diameter of 1 to 10 mm, an aspect ratio (average major axis diameter/average minor axis diameter) of 1 to 7, a bulk density of not less than 0.5 g/cm$^3$ and a powdering ratio of not more than 40% as measured by the method as defined in the 1st aspect.

In a sixth aspect of the present invention, there is provided magnetic iron oxide particles for magnetic recording, obtained by heat-treating in a reducing gas granulated particles which comprise acicular ferric hydroxide oxide particles or acicular hematite particles and at least one selected from the group consisting of semisynthetic starch and semisynthetic cellulose and which have an average major axis diameter of 1 to 70 mm, an average minor axis diameter of 1 to 7 mm, an aspect ratio (average major axis diameter/average minor axis diameter) of 1 to 10, a bulk density of not less than 0.3 g/cm$^3$ and a powdering ratio of not more than 40% as measured by the method as defined in the 1st aspect; and oxidizing the heat-treated granulated particles.

In a seventh aspect of the present invention, there is provided magnetic iron oxide particles for magnetic recording, obtained by dispersing as the precursor particles, the acicular maghemite particles or acicular magnetite particles obtained by heat-treating in a reducing gas the granulated particles which comprise acicular ferric hydroxide oxide particles or acicular hematite particles and at least one selected from the group consisting of semisynthetic starch and semisynthetic cellulose and which have an average major axis diameter of 1 to 70 mm, an average minor axis diameter of 1 to 7 mm, an aspect ratio (average major axis diameter/average minor axis diameter) of 1 to 10, a bulk density of not less than 0.3 g/cm$^3$ and a powdering ratio of not more than 40% as measured by the method as defined in the 1st aspect, in an alkali suspension containing cobalt hydroxide or an alkali suspension containing cobalt hydroxide and ferrous hydroxide; and heat-treating the resultant dispersion, thereby obtaining acicular magnetite particles or acicular maghemite particles modified With Co or Co and $Fe^{2+}$.

DETAILED DESCRIPTION OF THE INVENTION

As the acicular ferric hydroxide oxide particles, α-FeOOH particles, β-FeOOH particles and γ-FeOOH particles are usable in the present invention.

As the acicular iron oxide particles, acicular hematite particles obtained by dehydrating the acicular ferric hydroxide oxide particles at a temperature of 150° to 280° C.; acicular hematite particles having a high density and obtained by heat-treating the acicular ferric hydroxide oxide particles in a temperature range of 300° to 850° C. in a non-reducing atmosphere; acicular magnetite particles; acicular maghemite particles; and berthollide compounds ($FeOx \cdot Fe_2O_3$, $0<x<1$) are usable.

It is possible to add at least one of the elements other than Fe such as Al, Ni, Co, B, Zn, P and Si to the acicular ferric hydroxide oxide particles or the acicular iron oxide particles used in the present invention, or to coat the surfaces of these particles with at least one of the elements other than Fe such as Al, Ni, Co, B, Zn, P and Si in order to enhance the properties of the magnetic particles.

The acicular particles used as a raw material in the present invention refer to the particles having an average major axis diameter of 0.05 to 1.0 and an aspect ratio (average major axis diameter/average minor axis diameter) of not less than 3, preferably 5 to 20, and the shape thereof is not restricted to an acicular, but includes a spindle, a rice-ball and a strip. The magnetic particles in the present invention refer to magnetic iron oxide particles and magnetic iron based alloy particles.

The granulated particles for magnetic particles for magnetic recording according to the present invention are obtained by adding water- or hot water-soluble semisynthetic starch or semisynthetic cellulose to a suspension composed of acicular ferric hydroxide oxide particles or acicular iron oxide particles and water; stirring the resultant suspension; compressing and dehydrating the suspension to obtain a cake, and granulating the cake.

As the starch to be added to the suspension in the present invention, semisynthetic starches such as soluble starches, cationic starches and starches substituted by a hydrophilic group (e.g., carboxymethyl diadlehyde), and semisynthetic celluloses such as viscose and celluloses substituted by a hydrophilic group (e.g., methyl, ethyl, hydroxyl ether, carboxyl) are usable. These starches and celluloses are soluble to water or hot water.

The amount of semisynthetic starch or semisynthetic cellulose added is not less than 0.1 part by weight and less than 5.0 parts by weight, preferably 0.5 to 3.0 parts by weight based on 100 parts by weight of the acicular ferric hydroxide oxide particles or acicular ferric oxide particles in the suspension. From the industrial point of view, the amount of addition is preferably as small as possible in the range in which the effect of addition is manifested, but if it is less than 0.1 part by weight based on 100 parts by weight of the raw material particles, the advantages of the present invention are not obtained. If it is not less than 5.0 parts by weight based on 100 parts by weight of the raw material particles, the deleterious influence of the remaining organic material on the reduction is so large as to arise problems such as a reduction in the saturation magnetization and the prolongation of the reducing time.

As the means for granulating the acicular ferric hydroxide oxide particles or acicular iron oxide particles in the present invention, various methods such as rotary granulation, compression granulation, pulverization granulation and extrusion granulation are usable. A method comprising adding the semisynthetic starch and/or the semisynthetic cellulose to the suspension containing acicular ferric hydroxide oxide particles or acicular iron oxide particles, stirring the resultant suspension, compressing and dehydrating the suspension to obtain a cake by a filter-press, and extrusion-granulating the cake, is industrially preferred.

The granulated particles of the present invention has a bulk density of not less than 0.3 g/cm$^3$, preferably not less than 0.5 g/cm$^3$, and a powdering ratio of not more than 40%.

The granulated particles size is set forth below.

As to the granulated particles for magnetic iron based alloy particles, an average major axis diameter is 1 to 70 mm, preferably 1 to 35 mm, more preferably 1 to 25 mm, an average minor axis diameter is 1 to 10 mm, preferably 1 to 8.5 mm, more preferably 1 to 5 mm, and an aspect ratio (average major axis diameter/average minor axis diameter) is 1 to 7, preferably 1 to 5.

As to the granulated particles for magnetic iron oxide particles, an average major axis diameter is 1 to 70 mm, preferably 2 to 35 mm, more preferably 2 to 25 mm, an average minor axis diameter is 1 to 7 mm, preferably 2 to 5, and an aspect ratio (average major axis diameter/average minor axis diameter) is 1 to 10, preferably 1 to 5.

The shape thereof is granular, spherical, cubic, acicular, spindle, columnar, and square-polar.

If the average particle diameter of the granulated particles for magnetic particles for magnetic recording is less than 1 mm, it is unfavorable because, since the granulated particles start to flow in a stream of the blowing gas, collision and friction are caused between the particles, so that a sintering between the particles and the lost of shape of primary particles are apt to be caused. In addition, it is unfavorable from the view point of equipment, because a fine powder fly away from the reactor in the form of dust, which causes clogging of a discharge gas filter.

If the bulk density of the granulated particles for magnetic particles for magnetic recording is less than 0.3 g/cm³, the strength of the granulated particles is apt to become low and the powdering ratio is apt to increase, so that fine powder is likely to be produced, resulting in a sintering between the particles and, hence, a deterioration of the magnetic characteristics of the magnetic particles. In addition, since the weight per granulated particle is small, if the flow rate of the blowing gas is increased so as to increase the reduction efficiency, the granulated particles are likely to flow, so that collision and friction are caused between the particles, resulting often in a sintering between the particles and the lost of shape of primary particles.

If the powdering ratio of the granulated particles for magnetic particles for magnetic recording exceeds 40%, fine powder is likely to be produced by the powdering of the granulated particles caused when transferred, for example, charged into a heat-treating furnace, when friction is caused during the reduction and oxidization process due to the weak vibration applied to the granulated particles, and when the raw material is heated and expanded.

If such granulated particles are used as the raw material and reduced and oxidized in a rotary furnace or fluidized-bed furnace, or reduced in a fixed-bed reducing apparatus, the fine powder produced is existent locally in the bed and the pressure loss at that portion becomes large, thereby producing a channel of the blowing gas, which makes the progress of reduction and oxidization or reduction of the particles non-uniform and deteriorating the reducing and oxidizing efficiency or the reducing efficiency. As a result, the magnetic particles obtained disadvantageously have a wide distribution of the magnetic properties among the particles.

The heat-treatment in the present invention is conducted by an ordinary method in a temperature range of 150° to 850° C. The reduction in the present invention is conducted by an ordinary method in a temperature range of 300° to 550° C. The oxidization in the present invention is conducted by an ordinary method in a temperature range of 200° to 500° C.

Modification of the magnetic iron oxide particles in the present invention with Co or Co and $Fe^{2+}$ is conducted by dispersing the precursor particles such as acicular magnetite particles and acicular maghemite particles in an alkali suspension containing cobalt hydroxide or an alkali suspension containing cobalt hydroxide and iron hydroxide, and heat-treating the resultant dispersion, as described in Japanese Patent Publication Nos. 52-24237 (1977), 52-24238 (1977), 52-36751 (1977) and 52-36863 (1977).

The cobalt hydroxide is obtained by reacting a water-soluble cobalt salt such as cobalt sulfate and cobalt chloride, and an aqueous alkali hydroxide such as sodium hydroxide and potassium hydroxide.

The ferrous hydroxide is obtained by reacting a water-soluble ferrous salt such as ferrous sulfate and ferrous chloride, and an aqueous alkali hydroxide such as sodium hydroxide and potassium hydroxide.

The heat-treatment of the dispersion for the modification with Co or Co and $Fe^{2+}$ is preferably conducted in a temperature of 40° to 100° C. in a non-oxidizing atmosphere.

The temperature for the modification with Co or Co and $Fe^{2+}$ is concerned in the treating time. For example, if the temperature is not higher than 40° C. it is difficult to produce magnetite particles or maghemite particles modified with Co or Co and $Fe^{2+}$. Even if they are produced, very long-time treatment is necessary.

The amount of water-soluble cobalt salt used for the modification in the present invention is 0.5 to 15.0 atm % (calculated as Co) based on Fe in the precursor particles. If the amount is less than 0.5 atm %, it is difficult to sufficiently achieve the advantage of the modification, that is, to enhance the coercive force of the acicular magnetite particles or acicular maghemite particles produced. If the amount exceeds 15.0 atm %, it is difficult to sufficiently achieve the advantage of the modification, that is, to reduce the distribution of the coercive force of the acicular magnetite particles or acicular maghemite particles produced.

Approximately the total amount of water-soluble cobalt salt added is utilized for the modification of the surfaces of the magnetic iron oxide particles.

The preferable amount of water-soluble cobalt salt is 2.0 to 13.0 atm % (calculated as Co) based on Fe in the precursor particles with the coercive force and the coercive force distribution taken into consideration.

The amount of water-soluble ferrous salt is 2.0 to 30 atm %, preferably 4 to 15 atm % (calculated as $Fe^{+2}$) based on Fe.

The magnetic iron based alloy particles for magnetic recording according to the present invention are produced by heat-treating in a reducing gas the granulated iron oxide particles which have an average major axis diameter of 1 to 70 mm, an average minor axis diameter of 1 to 10 mm, an aspect ratio (average major axis diameter/average minor axis diameter) of 1 to 7, a bulk density of not less than 0.5 g/cm³ and a powdering ratio of not more than 40%, and which are produced by adding water- or hot water-soluble semisynthetic starch or semisynthetic cellulose to a suspension of acicular hematite particles containing Al, Ni, Co, B, Zn, P, and Si, stirring the resultant suspension, compressing and dehydrating the suspension to obtain a cake, and granulating the cake.

The heat-treatment is conducted at a temperature of 360° to 550° C. in a stream of hydrogen gas.

The magnetic iron based alloy particles after the heat-treatment are taken out into air by a known method, for example, by a method of immersing the particles in an organic solvent such as toluene, and a method of gradually oxidizing the atmosphere by replacing the atmosphere of the magnetic iron based alloy particles after the heat-treatment by an inert gas and gradually increasing the oxygen content in the inert gas so that the final atmosphere is air.

By adding semisynthetic starch or semisynthetic cellulose, it is possible to make the bond of the particles of the acicular ferric hydroxide oxide particles or acicular iron oxide particles firm and enhance the strength, thereby effectively preventing the generation of fine powder. As a result, it is possible to prevent a channel of the blowing gas in the furnace, make the progress of reduction and oxidization or reduction of the granulated iron oxide particles uniform. It is thus possible to produce the magnetic particles having a narrow distribution of the magnetic properties among the particles.

When the bulk density of the granulated particles exceeds 0.3 g/cm$^3$, since the distance between the primary particles which form the granulated particles is short, so that the speed at which the water generated by reduction diffuses within the granulated particles becomes low. This means that the granulated particles are apt to be maintained in the state in which partial pressure of the steam within the granulated particles is high. Therefore, if the bulk density increases, it is generally difficult to control the partial pressure of the steam within the granulated particles, so that sintering between the particles is apt to be caused.

However, in the case of the process of the present invention comprising adding water- or hot water-soluble semisynthetic starch or semisynthetic cellulose to the suspension composed of acicular ferric hydroxide oxide particles or acicular iron oxide particles and water, stirring the resultant suspension, compressing and dehydrating the suspension to obtain a cake, and granulating the cake, even if the bulk density of the granulated particles is not less than 0.3 g/cm$^3$, since the semisynthetic starch or semisynthetic cellulose added maintains an appropriate distance between the primary particles, this problem is solved.

As examples of the magnetic particles of the present invention, magnetic iron oxide particles and magnetic iron based alloy particles are exemplified. As examples of the magnetic iron oxide particles, acicular magnetite particles, acicular maghemite particles, Co-modified acicular magnetite particles and Co-modified acicular maghemite particles, Co and Fe$^{2+}$-modified acicular magnetite particles and Co and Fe$^{2+}$-modified acicular maghemite particles may be exemplified. As examples of the magnetic iron based alloy particles, Al, Ni, Co, B, Zn, P and/or Si-Fe alloy particles may be exemplified.

Granulated particles for magnetic iron oxide particles for magnetic recording according to the present invention, comprising acicular ferric hydroxide oxide particles or acicular ferric oxide particles and at least one selected from the group consisting of semisynthetic starch and semisynthetic cellulose, have an average major axis diameter of 1 to 70 mm, an average minor axis diameter of 1 to 7 mm, an aspect ratio (average major axis diameter/average minor axis diameter) of 1 to 10, a bulk density of not less than 0.3 g/cm$^3$ and a powdering ratio of not more than 40%.

The magnetic iron oxide particles of the present invention have a coercive force (Hc) of not less than 380 Oe, a saturation magnetization ($\sigma$s) of not less than 68.5 emu/g, a transfer P/T of not less than 57 dB, and an erasure property of not less than 53 dB, and the differences of the coercive force (Hc) and the saturation magnetization between the magnetic iron particles produced from granulated particles having a particle diameter of not less than 1 mm and the magnetic iron particles produced from granulated particles having a particle diameter of less than 1 mm are not more than 25 Oe and not more than 15 emu/g, respectively.

Granulated particles for magnetic iron based alloy particles for magnetic recording according to the present invention, comprising acicular goethite particles or acicular hematite particles containing Al, Ni, Co, B, Zn, P and/or Si, and at least one selected from the group consisting of semisynthetic starch and semisynthetic cellulose, have an average major axis diameter of 1 to 70 mm, an average minor axis diameter of 1 to 10 mm, an aspect ratio (average major axis diameter/average minor axis diameter) of 1 to 7, a bulk density of not less than 0.5 g/cm$^3$ and a powdering ratio of not more than 40%.

The magnetic iron based alloy particles of the present invention have the differences of the coercive force (Hc) and the saturation magnetization ($\sigma$s) between the magnetic iron based alloy particles produced from granulated particles having a particle diameter of not less than 1 mm and the magnetic iron based alloy particles produced from granulated particles having a particle diameter of less than 1 mm are not more than 30 Oe and not more than 5 emu/g, respectively; and an crystal size ($D_{110}$) of not more than 10 Å.

The magnetic recording medium comprising the magnetic particles according to the present invention has a coercive force (Hc) of not less than 680 Oe, a squareness of 0.80 to 0.87, and an S.F.D. value of not more than 0.45.

According to a method of producing magnetic particles for magnetic recording, since the acicular ferric hydroxide oxide particles or acicular iron oxide particles are used as the raw material, the amount of fine powder produced when a rotary furnace or a fixed-bed reducing apparatus is used is small, so that no channel of the blowing gas is produced in the bed at the time of heat-treatment, and the progress of reduction and oxidization reduction of the particles is uniform. It is, therefore, possible to produce magnetic particles for magnetic recording having a high coercive force and a narrow distribution of the coercive force among the particles, which are now in the strongest demand. Thus, the magnetic particles obtained are suitable as magnetic particles having a high recording density, a high sensitivity and producing a high output.

EXAMPLES

The present invention will be explained in more detail hereinunder with reference to the following example and comparative examples. It is to be understood, however, the present invention is not restricted to the following example within the scope of the invention.

The major axis diameter and the aspect ratio (major axis diameter/minor axis diameter) of the primary particles in each of the following examples and comparative examples are expressed by the average values measured in electron microphotographs. The major axis diameter and the aspect ratio (major axis diameter/minor axis diameter) of the granulated particles in each of the following examples and comparative examples are expressed by the average values in photographs.

The magnetic characteristics of magnetic particles were measured by using "Vibration Sample Magnetometer VSM-3S-15", manufactured by Toei Kogyo Kabushiki Kaisha and applying an external magnetic field up to 10 kOe.

The bulk density was measured as follow.

The funnel was mounted on a cylindrical quantitative cup having a capacity of 500 ml and a bottom inner diameter of 5.0 cm, which was placed horizontally. The sample (granulated particles) was taken on a funnel and drop gently into the cylindrical quantitative cup through the funnel. After dropping the sample thereinto until the sample was heaped up on the cylindrical quantitative cup, the mound was scraped off with a one side straight-edged spatula. The sample filled into the cylindrical quantitative cup of a capacity of 500 ml was weighted and the bulk density of the sample was calculated by the following expression.

Bulk Density (g/cc)=F/500

(wherein F represents a weight of the sample filled into the cylindrical quantitative cup)

The crystal size is expressed by a diameter of crystal grain in the direction vertical to the (110) crystal face thereof, which is a crystal grain size measured by X-ray diffraction method. The diameter of crystal grain is calculated from the line-profile of the diffracting line of (110) crystal face thereof by using the following Sheller formula.

$$\text{Crystal size } (D110)(\text{Å}) = \frac{K\lambda}{\beta\cos\theta}$$

(wherein β represents a half-width value of the true diffracting peak obtained by subtracting a machine error of the used apparatus therefrom, K represents a Sheller constant (=0.9), λ represents a wavelength of the X-ray used and θ represents an angle of diffraction)

S.F.D. value is determined by dividing a half-width value obtained from the differential curve of the coercive force of a sheet-like specimen by using a differentiating circuit of "Vibration Sample Magnetometer, VSM-3S-15", manufactured by Toei Kogyo Kabushiki Kaisha, by the coercive force at the peak of the differential curve thereof, the sheet-like specimens being produced by the following methods, respectively.

(i) Production of Magnetic Tape using the magnetic iron based alloy particles

The following components were charged into a plastic bottle of 100 cc in an inner volume, the obtained mixture was stirred and dispersed for 6 hours by a paint conditioner, Red-Deville (manufactured by Red-Deville Co., Ltd.) to prepare a magnetic coating composition. The obtained magnetic coating composition was applied to polyethylene terephthalate film having 25 μm in thickness so as to have a thickness of 50 μm by using an applicator, and dried under a magnetic field of 2 KGauss.

| | |
|---|---|
| Steel ball having a particle particle diameter of 3 mm | 800 parts by weight |
| Magnetic iron based alloy particles | 100 parts by weight |
| Polyurethane having a sodium sulfonate group | 18 parts by weight |
| Cyclohexane | 35.7 parts by weight |
| Methylethylketone | 107.1 parts by weight |
| Toluene | 107.1 parts by weight |

(ii) Production of Magnetic Tape using the magnetic iron oxide particles

The following components were mixed and dispersed by a paint conditioner for 2 hours to prepare a magnetic coating composition. The magnetic coating composition was applied to a polyethylene terephthalate film having a thickness of 25 μm to a thickness of 40 μm by using an applicator, and dried after the orientation in a magnetic field of 1650 Gauss.

| | |
|---|---|
| Glass beads of 1.5 mm in diameter | 100 g |
| Acicular magnetic iron oxide particles | 15 g |
| Toluene | 5.6 g |
| Phosphate ester (GAFAC RE-610, produced by Toho Chemical Industrial Co., Ltd) | 0.6 g |
| Lecithin | 0.6 g |
| Vinyl chloride-vinyl acetate copolymer (Vinylite VAGH, produced by Union Carbide Corp.) | 3.75 g |
| Butadiene Acrylonitrile rubber (Hycar 1432J, produced by Nihon Zeon Co., Ltd) | 0.75 g |
| Mixed solution of methyl isobutyl ketone:methyl ethyl ketone:toluene (= 3:1:1) | 40.5 g |

The powdering ratio was measured by the following method:

(1) 100 g of granulated particles having a diameter of more than 1 mm and 200 g of steel ball having a diameter of 12.5 mm were charged into a steel container having an inner diameter of 8.5 cm, a height of 8.5 cm and an inner volume of 482 cm³, and the resultant mixture was stirred at a peripheral speed of 50 rpm for 1 hour;

(2) the weight of the granulated particles having a diameter of less than 1 mm in the steel container was measured; and (3) the powdering ratio was obtained from the following formula:

Powdering ratio (%) = (the weight of the granulated particles having a diameter of less than 1 mm)/ (the weight (100 g) of the granulated particles before measurement) × 100.

EXAMPLE 1

The acicular goethite particles which were coated with an Al compound, a Co compound and a B compound (Al: 1.0 wt %, Co: 4.6 wt % and B: 0.9 wt %) and which had a major axis diameter of 0.23 μm, an aspect ratio (major axis diameter/minor axis diameter) of 11 were heat-treated at a temperature of 400° C. in air to produce acicular hematite particles.

The acicular hematite particles obtained were pulverized by a wet pulverizer to obtain a suspension of the acicular hematite particles.

After the solid concentration of the suspension of acicular hematite particles obtained was adjusted to 8 wt %, a solution of a cationic starch substituted by an aliphatic tertiary amine was added to the resultant suspension (the amount of cationic starch corresponds to 1 part by weight based on 100 parts by weight of the acicular hematite particles), and the resultant mixture was stirred. The mixture was then compressed and dehydrated by a filter-press to obtain a cake having a water content of 35 wt %, and the cake was extruded by using a molding screen having holes of 3 mm in diameter and dried at a temperature of 100° C. to obtain granulated iron oxide particles. The granulated iron oxide particles obtained had an average minor axis diameter of 2.5 mm, an aspect ratio of 2.9, a bulk density of 0.58 g/cm³ and a powdering ratio of 33%. The shape of the granulated iron oxide particles is columnar.

EXAMPLES 2 TO 13, COMPARATIVE EXAMPLES 1 TO 4

Granulated iron oxide particles for magnetic iron based alloy particles were produced in the same way as in Example 1 except for varying the kind of acicular goethite particles, the kind and the amount of element added, the heating temperature, the kind and the amount of semisynthetic starch or semisynthetic cellulose added and the hole diameter of the molding screen.

The main producing conditions and various properties of the products are shown in Table 1.

EXAMPLE 14

5 Kg of granulated iron oxide particles obtained in Example 1 were charged into a fixed-bed reducing apparatus having an inner diameter of 160 mm. Hydrogen gas was passed through the apparatus at a rate of 200 Nl/min and the granulated iron oxide particles were heat-treated at a temperature of 410° C. to obtain granulated magnetic iron based alloy particles. The reducing time was 20 hours.

The granulated magnetic iron based alloy particles in the fixed layer were immersed in toluene to be taken out, and were put through a sieve of 1 mm in mesh so as to sift out granulated magnetic iron based alloy particles having a diameter of not less than 1 mm from those having a diameter of less than 1 mm. Thereafter, a stable thin oxide film was formed while evaporating the toluene. The coercive force (Hc), the saturation magnetization ($\sigma s$) and the crystal size (D110) of the granulated magnetic iron based alloy particles having a particle diameter of not less than 1 mm were 1610 Oe, 158 emu/g, and 175, respectively. Also, the coercive force (Hc), the saturation magnetization ($\sigma s$) and the crystal size (D110) of the granulated magnetic iron based alloy particles having a particle diameter of less than 1 $\mu$m were 1595 Oe, 156 emu/g and 179, respectively. The distribution of each of the coercive force and the saturation magnetization among particles of both of the granulated magnetic iron based alloy particles was narrow.

A magnetic tape was produced by the method of Production of Magnetic Tape (i).

EXAMPLES 15 TO 18 AND COMPARATIVE EXAMPLE 5

Granulated iron based alloy particles were produced in the same way as in Example 14 except for varying the reducing temperature and the reducing time for heat-treating the granulated iron oxide particles obtained in Examples 5, 7, 9 and 10, and Comparative Example 1.

The main producing conditions and various properties of the products are shown in Table 2.

Although the distribution of each of the coercive force and the saturation magnetization among particles of the granulated magnetic iron based alloy particles obtained in Examples 14 to 18 was narrow, that of the granulated magnetic iron based alloy particles obtained in Comparative Example 5 was wide.

EXAMPLE 19

The acicular goethite particles which were coated with an Al compound, a Co compound and a B compound (Al: 0.8 wt %, Co: 4.5 wt % and B: 0.8 wt %) and which had a major axis diameter of 0.15 $\mu$m, an aspect ratio (major axis diameter/minor axis diameter) of 10 were heat-treated at a temperature of 350° C. in air to produce acicular hematite particles.

The acicular hematite particles obtained were pulverized by a wet pulverizer to obtain a suspension of the acicular hematite particles.

After the solid concentration of the suspension of acicular hematite particles obtained was adjusted to 8 wt %, a solution of a cationic starch substituted by an aliphatic tertiary amine was added to the resultant suspension (the amount of cationic starch corresponds to 0.5 part by weight based on 100 parts by weight of the acicular hematite particles), and the resultant mixture was stirred. The mixture was then compressed and dehydrated by a filter press to obtain a cake having a water content of 35 wt %, and the cake was extruded by using a molding screen having holes of 2.5 mm in diameter and dried at a temperature of 100° C. to obtain granulated iron oxide particles. The granulated iron oxide particles obtained had an average minor axis diameter of 2.4 mm, an aspect ratio of 2.6, a bulk density of 0.59 g/cm$^3$ and a powdering ratio of 36%. The shape of the granulated iron oxide particles is columnar.

EXAMPLES 20 TO 30, COMPARATIVE EXAMPLES 6 to 10

Granulated iron oxide particles for magnetic iron based alloy particles were produced in the same way as in Example 19 except for varying the kind of acicular goethite particles, the kind and the amount of element added, the heating temperature, the kind and the amount of semisynthetic starch or semisynthetic cellulose added and the hole diameter of the molding screen.

The main producing conditions and various properties of the products are shown in Table 3.

In Example 28 and Comparative Example 9, acicular goethite particles were used in place of the acicular hematite particles.

In Example 29, acicular $Fe_3O_4$ particles obtained by dehydrating goethite particles at a temperature of 400° C. and reducing the thus obtained $\alpha$-$Fe_2O_3$ particles at a temperature of 300° C., were used instead of the acicular hematite particles.

EXAMPLE 31

5 Kg of granulated iron oxide particles obtained in Example 19 were charged into a fixed-bed reducing apparatus having an inner diameter of 160 mm. Hydrogen gas was passed through the apparatus at a rate of 200 Nl/min and the particles were heat-treated at a temperature of 390° C. to obtain granulated magnetic iron based alloy particles. The reducing time was 22 hours.

The granulated magnetic iron based alloy particles in the fixed layer were immersed in toluene to be taken out, and were put through a sieve of 1 mm in mesh so as to sift out granulated magnetic iron based alloy particles having a diameter of not less than 1 mm from those having a diameter of less than 1 mm. Thereafter, a stable thin oxide film was formed on the surfaces of the particles while evaporating the toluene.

The coercive force (Hc), the saturation magnetization ($\sigma s$) and the crystal size (D110) of the granulated magnetic iron based alloy particles having a particle diameter of not less than 1 mm were 1730 Oe, 152 emu/g and 160, respectively. Also, the coercive force (Hc), the saturation magnetization ($\sigma s$), the crystal size (D110) of the granulated magnetic iron based alloy particles having a particle diameter of less than 1 mm were 1710 Oe, 149 emu/g and 165, respectively. The distribution of each of the coercive force and the saturation magnetization among particles of both of the granulated magnetic iron based alloy particles was narrow.

A magnetic tape was produced by the method of Production of Magnetic Tape (i).

EXAMPLES 32 TO 42, COMPARATIVE EXAMPLES 11 TO 15

Granulated iron based alloy particles were produced in the same way as in Example 31 except for varying the kind of granulated iron oxide particles, the reducing temperature and the reducing time.

The main producing conditions and various properties of the products are shown in Table 4.

In Example 42 and Comparative Example 15, the hydrogen gas was passed at a rate of 300 Nl/min instead of 200 Nl/min.

Although the distribution of each of the coercive force and the saturation magnetization among particles of the granulated magnetic iron based alloy particles obtained in Examples 32 to 42 was narrow, that of the granulated magnetic iron based alloy particles obtained in Comparative Examples 11 to 15 was wide.

EXAMPLE 43

360 liter of an aqueous ferrous sulfate containing 1.50 mol/l of $Fe^{2+}$ was added to 540 liter of an aqueous solution of NaOH of 4.6N which was prepared in a reactor in advance, and ferrous hydroxide particles were produced at pH of 13.2 and at a temperature of 45° C. Thereafter, the particles were oxidized by air to obtain acicular goethite particles having a major axis diameter of 0.35 μm and an aspect ratio of 14.

The acicular goethite particles obtained were suspended in water, and the solid concentration of the suspension of acicular goethite particles obtained was adjusted to 8 wt %. A solution of a cationic starch substituted by an aliphatic tertiary amine was added to the resultant suspension (the amount of cationic starch corresponds to 1 part by weight based on 100 parts by weight of the acicular goethite particles), and the resultant mixture was stirred. The mixture was then compressed and dehydrated by a filter press to obtain a cake having a water content of 35 wt %, and the cake was extruded by using a molding screen having holes of 4 mm in diameter and dried at a temperature of 105° C. to obtain granulated ferric hydroxide oxide particles. The granulated ferric hydroxide oxide particles obtained had an average major axis diameter of 10.4 mm, an average minor axis diameter of 3.7 mm, an aspect ratio of 2.8, a bulk density of 0.35 g/cm³ and a powdering ratio of 30%. The shape of the granulated ferric hydroxide oxide particles is columnar.

EXAMPLES 44 TO 48, COMPARATIVE EXAMPLES 16 TO 20

Granulated particles for magnetic iron oxide particles for magnetic recording were produced in the same way as in Example 43 except for varying the kind of the starting material, the heating temperature, the kind and the amount of semisynthetic starch or semisynthetic cellulose added and the hole diameter of the molding screen.

The main producing conditions and various properties of the products are shown in Table 5.

In Example 48, acicular hematite particles were used in place of the acicular goethite particles.

EXAMPLE 49

1300 g of the granulated acicular ferric hydroxide oxide particles obtained in Example 43 were heat-treated at a temperature of 400° C. in air to obtain granulated acicular hematite particles.

The granulated acicular hematite particles were charged into a reducing retort, and $H_2$ gas was passed through the retort at a rate of 2 l/min while rotating the retort so that the granulated acicular hematite particles were reduced at a temperature of 400° C., thereby obtaining granulated acicular magnetite particles.

The granulated acicular magnetite particles obtained were put through a sieve of 1 mm in mesh so as to sift out granulated acicular magnetite particles iron having a particle diameter of not less than 1 mm from those having a particle diameter of less than 1 mm.

The granulated acicular magnetite particles having a particle diameter of not less than 1 mm had a coercive force (Hc) of 445 Oe, a saturation magnetization ($\sigma s$) of 84.8 emu/g, a transfer (P/T) of 57.5 dB and an erasure property of 53.5 dB. Also, the granulated acicular magnetite particles having a particle diameter of less than 1 mm had a coercive force (Hc) of 430 Oe, a saturation magnetization ($\sigma s$) of 83.5 emu/g, a transfer (P/T) of 55.9 dB and an erasure property of 52.6 dB. The distribution of each of the coercive force and the saturation magnetization among particles of both of the acicular magnetite particles was narrow.

The acicular magnetite particles obtained by pulverizing the granulated acicular magnetite particles before sieving by an ordinary method had a coercive force (Hc) of 441 Oe, a saturation magnetization ($\sigma s$) of 84.3 emu/g, a transfer (P/T) of 57.3 dB and an erasure property of 53.1 dB.

The magnetic tape produced by the method of Production of Magnetic Tape (ii), had a coercive force (Hc) of 420 Oe, a squareness (Rs) of 0.80 and an S.F.D. value of 0.44.

EXAMPLE 50

1300 g of the granulated acicular ferric hydroxide oxide particles obtained in Example 43 were heat-treated at a temperature of 400° C. in air to obtain granulated acicular hematite particles.

The granulated acicular hematite particles were charged into a reducing retort, and $H_2$ gas was passed through the retort at a rate of 2 l/min while rotating the retort so that the granulated acicular hematite particles were reduced at a temperature of 400° C., thereby obtaining granulated acicular magnetite particles.

The granulated acicular magnetite particles obtained were oxidized in air at a temperature of 300° C. for 60 minutes to obtain acicular maghemite particles.

The acicular maghemite particles obtained were put through a sieve of 1 mm in mesh so as to sift out granulated acicular maghemite particles having a diameter of not less than 1 mm from those having a diameter of less than 1 mm.

A magnetic tape was produced by using the acicular maghemite particles in the same way as in Example 49.

The main producing condition and various properties of the products are shown in Table 6.

EXAMPLES 51 TO 55, COMPARATIVE EXAMPLES 21 TO 25

Granulated acicular magnetite particles or acicular maghemite particles were produced in the same way as in Example 50 except for varying the kind of the granulated particles as the starting material, the dehydrating temperature, the heating temperature and the oxidizing temperature. Magnetic tapes were also produced in the same way as in Example 49. The main producing conditions and various properties of the products are shown in Table 6.

EXAMPLE 56

800 g of the acicular magnetite particles obtained in Example 49 were mixed with 8 liter of an aqueous solution of cobalt sulfate and ferrous sulfate with 0.41 mol of cobalt and 1.43 mol of ferrous iron dissolved therein while preventing air from entering the solution as much as possible, and dispersed until the acicular magnetite particles formed a fine slurry. 1650 ml of an aqueous solution of NaOH of 18N was then poured into the resultant dispersion, and water was further added so that the dispersion was 13 liter in the whole volume and had an OH concentration of 2 mol/l. The temperature of the dispersion was raised to 100° C., and the dispersion was mixed at this temperature for 5 hours. The slurry was taken out, filtered, washed with water and dried at a temperature of 60° C. to obtain acicular magnetite particles modified with Co and $Fe^{2+}$.

When the magnetic properties of the particles obtained were measured, the coercive force (Hc) was 748 Oe, the saturation magnetization ($\sigma$s) 84.7 emu/g, the transfer (P/T) 58.9 dB and the erasure property 53.5 dB.

A magnetic tape was produced by using the acicular magnetite particles modified with Co and $Fe^{2+}$ in the same way as in Example 49. The magnetic properties of the tape produced are shown in Table 7.

EXAMPLES 57 TO 60 AND COMPARATIVE EXAMPLES 26 TO 27

Acicular magnetic particles modified with Co or Co and $Fe^{2+}$ were produced in the same way as in Example 56 except for varying the kind of the precursor as the raw material, the amount of Co compound added and the amount of $Fe^{2+}$ compound of added. Further, a magnetic tape was produced in the same way as in Example 49.

The main producing conditions and properties of the products are shown in Table 7.

TABLE 1

| Example and Comp. Example | Acicular goethite particles | | | | Semisynthetic starch and semisynthetic cellulose | | Granulated iron oxide particles | | | |
|---|---|---|---|---|---|---|---|---|---|---|
| | Major axis diameter (μm) | Aspect ratio | Heating temperature (°C.) | Kind and amount of element added (wt %) | Kind | Amount (wt %) | Average minor axis diameter (mm) | Aspect ratio | Bulk density (g/cm³) | Powdering ratio |
| Ex. | | | | | | | | | | |
| 1 | 0.23 | 11 | 400 | Al = 1.0, Co = 4.6, B = 0.9 | Cationic starch | 1.0 | 2.5 | 2.9 | 0.58 | 33 |
| 2 | 0.21 | 10 | 350 | Al = 0.8, Co = 5.0, B = 0.6 | Cationic starch | 0.8 | 2.4 | 2.8 | 0.59 | 35 |
| 3 | 0.26 | 11 | 450 | Al = 1.1, Co = 5.2, B = 0.9 | Cationic starch | 0.8 | 2.5 | 3.0 | 0.55 | 31 |
| 4 | 0.38 | 14 | 500 | Al = 2.2, Co = 3.1, SiO = 2.5 | Cationic starch | 1.5 | 2.4 | 2.9 | 0.55 | 32 |
| 5 | 0.60 | 15 | 500 | Al = 3.0, Co = 4.6, SiO = 2.2 | Cationic starch | 1.0 | 2.6 | 3.0 | 0.54 | 28 |
| 6 | 0.84 | 16 | 500 | Al = 2.0, Ni = 2.3, SiO = 2.3 | Cationic starch | 1.2 | 3.0 | 3.2 | 0.52 | 25 |
| 7 | 0.16 | 10 | 350 | Al = 1.2, Co = 4.8, B = 0.4, SiO = 1.1 | Cationic starch | 0.5 | 2.4 | 2.7 | 0.59 | 35 |
| 8 | 0.23 | 9 | 400 | Al = 1.8, Co = 4.5, B = 0.9 | Cationic starch | 1.0 | 4.0 | 3.4 | 0.55 | 18 |
| 9 | 0.21 | 10 | 350 | Al = 1.6, B = 0.8 | Soluble starch | 1.5 | 2.5 | 2.8 | 0.58 | 37 |
| 10 | 0.15 | 11 | 350 | Al = 1.2, Co = 4.8, B = 0.6 | Carboxymethyl starch | 1.5 | 2.4 | 3.0 | 0.59 | 36 |
| 11 | 0.21 | 10 | 350 | Al = 1.6, B = 0.8 | Carboxymethyl starch | 1.2 | 2.4 | 3.1 | 0.59 | 37 |
| 12 | 0.21 | 10 | 350 | Al = 1.6, B = 0.8 | Methyl cellulose | 2.5 | 2.5 | 2.8 | 0.58 | 30 |
| 13 | 0.23 | 10 | 400 | Al = 1.0, Co = 4.6, B = 0.9 | Ethyl cellulose | 3.8 | 2.5 | 2.9 | 0.59 | 27 |
| Comp. Ex. | | | | | | | | | | |
| 1 | 0.21 | 10 | 350 | Al = 1.6, B = 0.8 | None | — | 2.4 | 2.5 | 0.60 | 68 |
| 2 | 0.16 | 10 | 350 | Al = 1.2, Co = 4.8, B = 0.4, SiO = 1.1 | None | — | 2.5 | 2.2 | 0.61 | 66 |
| 3 | 0.60 | 15 | 500 | Al = 3.0, Co = 4.6, SiO = 2.2 | None | — | 2.6 | 2.2 | 0.56 | 64 |
| 4 | 0.23 | 11 | 400 | Al = 1.0, Co = 4.6, B = 0.9 | Cationic starch | 20 | 2.4 | 3.2 | 0.59 | 52 |

TABLE 2

| Application Example | Example No. and Comparative Example No. | Production of granulated magnetic iron alloy particles Reducing temperature (°C.) | Reducing time (hr) | Granulated magnetic iron alloy particles Particle dia-meter ≥ 1 mm Hc (Oe) | σs (emu/g) | D110 (Å) | Granulated magnetic iron alloy particles Particle dia-meter < 1 mm Hc (Oe) | σs (emu/g) | D110 (Å) | Properties of Tape Hc (Oe) | Square ness | S.F.D |
|---|---|---|---|---|---|---|---|---|---|---|---|---|
| Appln Ex. | Ex. No. | | | | | | | | | | | |
| 14 | 1 | 410 | 20 | 1610 | 158 | 175 | 1595 | 156 | 179 | | 0.81 | 0.50 |
| 15 | 5 | 430 | 12.5 | 1410 | 162 | 212 | 1410 | 160 | 212 | | 0.85 | 0.42 |
| 16 | 7 | 390 | 24 | 1635 | 153 | 164 | 1615 | 150 | 170 | | 0.78 | 0.53 |
| 17 | 9 | 390 | 23 | 1625 | 150 | 172 | 1600 | 147 | 178 | | 0.78 | 0.56 |
| 18 | 10 | 380 | 21 | 1705 | 149 | 170 | 1685 | 146 | 175 | | 0.77 | 0.56 |
| Comp. Ex 5 | Comp. Ex. No. 1 | 390 | 28 | 1625 | 149 | 178 | 1575 | 135 | 190 | | 0.73 | 0.66 |

TABLE 3

| Example and Comp. Example | Acicular goethite particles Major axis diameter (μm) | Aspect ratio | Heating temperature (°C) | Kind and amount of element added (wt %) | Semisynthetic starch and semisynthetic cellulose Kind | Amount (wt %) | Granulated iron oxide particles Average minor axis diameter (mm) | Aspect ratio | Bulk density (g/cm³) | Powdering ratio |
|---|---|---|---|---|---|---|---|---|---|---|
| Ex. | | | | | | | | | | |
| 19 | 0.15 | 10 | 350 | Al = 0.8, Co = 4.5, B = 0.8 | Cationic starch | 0.5 | 2.4 | 2.6 | 0.59 | 36 |
| 20 | 0.26 | 11 | 450 | Al = 1.1, Co = 5.2, B = 0.9 | Cationic starch | 0.8 | 2.5 | 3.0 | 0.55 | 31 |
| 21 | 0.38 | 14 | 500 | Al = 2.2, Co = 3.1, SiO = 2.5 | Cationic starch | 1.5 | 2.4 | 2.9 | 0.55 | 32 |
| 22 | 0.84 | 16 | 500 | Al = 2.0, Ni = 2.3, SiO = 2.3 | Cationic starch | 1.2 | 3.0 | 3.2 | 0.52 | 25 |
| 23 | 0.23 | 9 | 400 | Al = 1.8, Co = 4.5, B = 0.9 | Cationic starch | 1.0 | 4.0 | 3.4 | 0.55 | 18 |
| 24 | 0.20 | 9 | 350 | Al = 1.0, Co = 2.0, SiO = 1.4 | Soluble starch | 1.0 | 2.4 | 3.0 | 0.58 | 36 |
| 25 | 0.21 | 10 | 350 | Al = 1.6, B = 0.8 | Carboxymethyl starch | 1.2 | 2.4 | 3.1 | 0.59 | 37 |
| 26 | 0.21 | 10 | 350 | Al = 1.6, B = 0.8 | Methyl cellulose | 2.5 | 2.5 | 2.8 | 0.58 | 30 |
| 27 | 0.23 | 10 | 400 | Al = 1.0, C0 = 4.6, B = 0.9 | Ethyl cellulose | 3.8 | 2.5 | 2.9 | 0.59 | 27 |
| 28 | 0.06 | 5 | *1 | Al = 2.1, B = 0.7 | Methyl cellulose | 3.0 | 3.8 | 4.1 | 0.52 | 36 |
| 29 | 0.20 | 9 | Heating: 400 Reducing: 300 *2 | Al = 1.0, Co = 2.0, SiO = 1.4 | Soluble starch | 2.0 | 2.3 | 2.5 | 0.58 | 38 |
| 30 | 0.10 | 6 | 300 | Al = 2.0, B = 1.0 | Soluble starch | 2.0 | 8.0 | 4.2 | 0.63 | 38 |
| Comp. Ex. | | | | | | | | | | |
| 6 | 0.16 | 10 | 350 | Al = 1.2, Co = 4.8, B = 0.4, SiO = 1.1 | None | — | 2.5 | 2.2 | 0.61 | 66 |
| 7 | 0.60 | 15 | 500 | Al = 3.0, Co = 4.6, SiO = 2.2 | None | — | 2.6 | 2.2 | 0.56 | 64 |
| 8 | 0.23 | 11 | 400 | Al = 1.0, Co = 4.6, B = 0.9 | Cationic starch | 20 | 2.4 | 3.2 | 0.59 | 52 |
| 9 | 0.06 | 5 | — | Al = 2.1, B = 0.7 | None | — | 3.8 | 3.7 | 0.53 | 65 |
| 10 | 0.10 | 6 | 300 | Al = 2.0, B = 1.0 | None | — | 8.0 | 3.6 | 0.65 | 67 |

(Note)
*1: To add starch or cellulose to α-FeOOH
*2: To add starch or cellulose to $Fe_3O_4$

TABLE 4

| Example and Comparative Example | Kind of granulated iron oxide particles Ex. No. and Comp. Ex. No. | Production of granulated magnetic iron alloy particles Reducing temperature (°C.) | Reducing time (hr) | Granulated magnetic iron alloy particles Particle diameter ≥ 1 mm Hc (Oe) | σs (emu/g) | D110 (Å) |
|---|---|---|---|---|---|---|
| Ex. 31 | Ex. 19 | 390 | 22 | 1730 | 152 | 160 |
| 32 | 20 | 430 | 14.5 | 1550 | 160 | 175 |
| 33 | 21 | 430 | 13 | 1460 | 160 | 191 |
| 34 | 22 | 430 | 14 | 1400 | 162 | 218 |
| 35 | 23 | 410 | 20 | 1615 | 159 | 176 |
| 36 | 24 | 390 | 23 | 1580 | 150 | 166 |
| 37 | 25 | 390 | 23 | 1625 | 150 | 171 |
| 38 | 26 | 390 | 25 | 1620 | 149 | 170 |
| 39 | 27 | 410 | 23 | 1590 | 156 | 175 |
| 40 | 28 | 400 | 20 | 1385 | 136 | 152 |
| 41 | 29 | 390 | 21 | 1550 | 148 | 172 |
| 42 | 30 | 380* | 25 | 1420 | 130 | 156 |
| Comp. 11 | Comp. 6 | 390 | 30.5 | 1615 | 152 | 173 |
| Ex. 12 | Ex. 7 | 410 | 28 | 1400 | 160 | 215 |
| 13 | 8 | 400 | 26.5 | 1330 | 157 | 182 |
| 14 | 9 | 400 | 28 | 1350 | 133 | 154 |
| 15 | 10 | 380* | 31 | 1405 | 129 | 157 |
| 13 | | 1290 | 148 | 193 | 0.75 | 0.62 |
| 14 | | 1290 | 117 | 167 | 0.65 | 0.74 |
| 15* | | 1360 | 119 | 168 | 0.68 | 0.72 |

| Example and Comparative Example | Granulated magnetic iron alloy particles Particle diameter < 1 mm Hc (Oe) | σs (emu/g) | D110 (Å) | Properties of tape Squareness | S.F.D. |
|---|---|---|---|---|---|
| Ex. 31 | 1710 | 149 | 165 | 0.80 | 0.51 |
| 32 | 1545 | 159 | 176 | 0.83 | 0.46 |
| 33 | 1455 | 159 | 193 | 0.80 | 0.51 |
| 34 | 1400 | 162 | 218 | 0.83 | 0.45 |
| 35 | 1605 | 158 | 178 | 0.82 | 0.46 |
| 36 | 1555 | 147 | 172 | 0.75 | 0.57 |
| 37 | 1600 | 147 | 176 | 0.78 | 0.55 |
| 38 | 1600 | 147 | 175 | 0.78 | 0.55 |
| 39 | 1580 | 155 | 177 | 0.80 | 0.47 |
| 40 | 1355 | 133 | 160 | 0.68 | 0.70 |
| 41 | 1525 | 145 | 179 | 0.73 | 0.59 |
| 42* | 1390 | 126 | 161 | 0.70 | 0.67 |
| Comp. 11 | 1550 | 135 | 186 | 0.73 | 0.64 |
| Ex. 12 | 1360 | 149 | 227 | 0.76 | 0.63 |

(Note) *Gas floting ratio of 300 Nl/min

TABLE 5

| Example and Comp. Example | Acicular goethite particles Major axis diameter (μm) | Aspect ratio | Heating temperature (°C.) | Semisynthetic starch and semisynthetic cellulose Kind | Amount (wt %) |
|---|---|---|---|---|---|
| Ex. 43 | 0.35 | 14 | — | Cationic starch | 1.0 |
| 44 | 0.25 | 10 | — | Cationic starch | 1.0 |
| 45 | 0.55 | 17 | — | Cationic starch | 1.0 |
| 46 | 0.35 | 14 | — | Cationic starch | 2.0 |
| 47 | 0.35 | 14 | — | Ethyl cellulose | 1.0 |
| 48 | 0.35 | 14 | 400 | Cationic starch | 1.0 |
| Comp. 16 | 0.35 | 14 | — | — | — |
| Ex. 17 | 0.25 | 10 | — | — | — |
| 18 | 0.65 | 18 | — | — | — |
| 19 | 0.35 | 14 | — | Cationic starch | 15 |
| 20 | 0.35 | 14 | — | Cationic starch | 1.0 |

| Example and Comp. Example | Granulated iron oxide particles Average minor axis diameter (mm) | Average major axis diameter (mm) | Aspect ratio | Bulk density (g/cm³) | Powdering ratio |
|---|---|---|---|---|---|
| Ex. 43 | 3.7 | 10.4 | 2.8 | 0.35 | 30 |
| 44 | 3.8 | 10.3 | 2.7 | 0.39 | 35 |
| 45 | 3.9 | 12.9 | 3.3 | 0.38 | 23 |
| 46 | 3.8 | 11.4 | 3.0 | 0.39 | 28 |
| 47 | 3.9 | 11.7 | 3.0 | 0.38 | 32 |
| 48 | 3.8 | 9.9 | 2.6 | 0.43 | 25 |
| Comp. 16 | 3.8 | 9.9 | 2.6 | 0.37 | 58 |
| Ex. 17 | 3.9 | 9.8 | 2.5 | 0.37 | 65 |
| 18 | 4.0 | 12.0 | 3.0 | 0.37 | 55 |
| 19 | 3.7 | 11.5 | 3.1 | 0.38 | 28 |
| 20 | 10.5 | 36.8 | 3.5 | 0.25 | 35 |

TABLE 6

| Example and Comp. Example | Kind of granulated particles (Example No. and Comparative Example No.) | Heat-treating conditions Dehydrating temperature (°C.) | Reducing temperature (°C.) | Oxidizing temperature (°C.) | Magnetic iron oxide particles for magnetic recording Particles diameter ≥ 1 mm Hc (Oe) | σs (emu/g) | P/T (dB) | Erasure (dB) | Particle diameter < 1 mm Hc (Oe) | σs (emu/g) | P/T (dB) | Erasure (dB) |
|---|---|---|---|---|---|---|---|---|---|---|---|---|
| Ex. 49 | Ex. 43 | 400 | 400 | — | 445 | 84.8 | 57.5 | 53.5 | 430 | 83.5 | 55.9 | 52.6 |
| 50 | 43 | 400 | 400 | 300 | 420 | 70.5 | 61.0 | 54.5 | 405 | 69.5 | 58.5 | 53.5 |
| 51 | 44 | 350 | 350 | 300 | 390 | 69.0 | 58.0 | 53.9 | 378 | 68.0 | 56.8 | 52.9 |
| 52 | 45 | 400 | 400 | 300 | 430 | 71.5 | 61.8 | 55.0 | 415 | 70.5 | 59.5 | 54.5 |
| 53 | 46 | 400 | 400 | 300 | 425 | 70.8 | 60.6 | 54.0 | 413 | 69.8 | 58.5 | 54.0 |
| 54 | 47 | 350 | 350 | 300 | 410 | 70.0 | 59.7 | 56.0 | 388 | 68.9 | 57.2 | 55.0 |
| 55 | 48 | — | 350 | 300 | 410 | 70.0 | 60.5 | 54.0 | 398 | 69.5 | 58.5 | 54.0 |
| Comp. 21 | Comp 16 | 400 | 400 | 300 | 418 | 71.0 | 60.2 | 54.0 | 380 | 68.0 | 55.0 | 53.1 |
| Ex. 22 | Ex. 17 | 350 | 350 | 300 | 389 | 68.5 | 57.5 | 53.5 | 365 | 66.5 | 54.0 | 53.4 |
| 23 | 18 | 400 | 400 | 300 | 425 | 71.0 | 60.5 | 54.5 | 390 | 68.0 | 56.0 | 53.2 |
| 24 | 19 | 400 | 400 | 300 | 373 | 67.9 | 56.9 | 55.0 | 354 | 65.3 | 52.3 | 54.0 |

TABLE 6-continued

| 25 | 20 | 400 | 400 | 300 | 370 | 68.0 | 57.0 | 55.0 | 355 | 65.0 | 52.0 | 54.0 |

| Example and Comp. Example | Kind of granulated particles (Example No. and Comp. Example No.) | Magnetic iron oxide particles for magnetic recording | | | | Properties of tape | | |
|---|---|---|---|---|---|---|---|---|
| | | Hc (Oe) | σs (emu/g) | P/T (dB) | Erasure (dB) | Hc (Oe) | Squareness (−) | S.F.D. (−) |
| Ex. 49 | Ex. 43 | 441 | 84.3 | 57.3 | 53.1 | 420 | 0.80 | 0.44 |
| 50 | 43 | 417 | 70.1 | 60.0 | 54.0 | 395 | 0.83 | 0.40 |
| 51 | 44 | 389 | 68.8 | 57.5 | 53.6 | 365 | 0.79 | 0.45 |
| 52 | 45 | 427 | 71.5 | 61.0 | 54.8 | 408 | 0.84 | 0.38 |
| 53 | 46 | 423 | 70.5 | 59.8 | 54.1 | 402 | 0.82 | 0.40 |
| 54 | 47 | 405 | 69.5 | 58.3 | 55.5 | 388 | 0.82 | 0.41 |
| 55 | 48 | 408 | 69.9 | 59.5 | 54.0 | 394 | 0.83 | 0.41 |
| Comp. 21 | Comp. 16 | 395 | 69.2 | 57.2 | 53.3 | 380 | 0.81 | 0.45 |
| Ex. 22 | Ex. 17 | 371 | 67.2 | 55.0 | 53.4 | 350 | 0.77 | 0.48 |
| 23 | 18 | 407 | 69.3 | 58.0 | 53.7 | 391 | 0.80 | 0.43 |
| 24 | 19 | 368 | 67.5 | 55.8 | 54.6 | 354 | 0.80 | 0.45 |
| 25 | 20 | 365 | 67.0 | 55.0 | 54.7 | 351 | 0.80 | 0.45 |

TABLE 7

| Example and Comparative Example | Kind of magnetic iron oxide particles Example and (Example No. and Comparative Example No.) | Production of Co or Co and $Fe^{2+}$-modified magnetic iron oxide particles | | |
|---|---|---|---|---|
| | | Amount of Co added (atm %) | Amount of $Fe^{2+}$ added (atm %) | f-OH concentration (mol/l) |
| Ex. 56 | Ex. 49 | 3.95 | 13.80 | 2 |
| 57 | 50 | 4.09 | 14.27 | 2 |
| 58 | 53 | 4.09 | 14.27 | 2 |
| 59 | 55 | 4.09 | 14.27 | 2 |
| 60 | 49 | 4.34 | — | 2 |
| Comp. 26 | Comp. 21 | 4.09 | 14.27 | 2 |
| Ex. 27 | Ex. 24 | 4.09 | 14.27 | 2 |

| Example and Comparative Example | Kind of magnetic iron oxide particles (Example No. and Comparative Example No.) | Magnetic iron oxide particles for magnetic recording | | | | Properties of tape | | |
|---|---|---|---|---|---|---|---|---|
| | | Hc (Oe) | σs (emu/g) | P/T (dB) | Erasure (dB) | Hc (Oe) | Squareness (−) | S.F.D. (−) |
| Ex. 55 | Ex. 49 | 748 | 84.7 | 58.9 | 53.5 | 755 | 0.81 | 0.44 |
| 56 | 50 | 696 | 78.0 | 61.5 | 56.0 | 700 | 0.84 | 0.42 |
| 57 | 53 | 693 | 78.4 | 62.0 | 54.9 | 705 | 0.83 | 0.41 |
| 58 | 55 | 700 | 78.4 | 62.0 | 54.9 | 705 | 0.83 | 0.41 |
| 59 | 49 | 690 | 78.9 | 63.8 | 57.0 | 700 | 0.86 | 0.41 |
| Comp. 26 | Comp. 21 | 690 | 78.5 | 59.5 | 52.0 | 698 | 0.82 | 0.47 |
| 27 | 24 | 644 | 76.9 | 57.3 | 53.9 | 660 | 0.80 | 0.45 |

What is claimed is:

1. Granulated particles for magnetic particles for magnetic recording, comprising:

acicular ferric oxide hydroxide particles or acicular iron oxide particles and at least one member selected from the group consisting of soluble starches, cationic starches, starches substituted with a carboxymethyl group or dialdehyde group, viscose and celluloses substituted with a methyl group, ethyl group, hydroxyl ether group or carboxyl group, in an amount not less than 0.1 part by weight and less than 5.0 parts by weight based on 100 parts by weight of the acicular ferric oxide hydroxide particles or acicular iron oxide particles;

said granulated particles having a bulk density of not less than 0.3 g/cm³ and a powdering ratio of not more than 40% as measured by the following method:

(1) charging 100 g of granulated particles having a diameter of more than 1 mm and 200 g of steel balls each having a diameter of 12.5 mm into a steel container having an inner diameter of 8.5 cm, a height of 8.5 cm and an inner volume of 482 cm³, and stirring the resultant mixture at a peripheral speed of 50 rpm for 1 hour;

(2) measuring the weight of the granulated particles having a diameter of less than 1 mm in the steel container and (3) determining the powdering ratio from the following formula:

Powdering ratio (%) = (the weight of the granulated particles having a diameter of less than 1 mm)/ (the weight (100 g) of the granulated particles before measurement) × 100.

2. Granulated particles according to claim 1, wherein said granulated particles comprise acicular ferric oxide hydroxide particles or acicular iron oxide particles containing at least one element selected from the group consisting of Al, Ni, Co, B, Zn, P and Si and at least one member selected from the group consisting of soluble starches, cationic starches, starches substituted with a carboxymethyl group or dialdehyde group, viscose and celluloses substituted with a methyl group, ethyl group, hydroxyl ether group or carboxyl group, in an amount not less than 0.1 part by weight and less than 5.0 parts by weight based on 100 parts by weight of the acicular ferric oxide hydroxide particles or acicular iron oxide particles;

said granulated particles having an average major axis diameter of 1 to 70 mm, an average minor axis diameter of I to 10 mm, an aspect ratio (average major axis diameter/average minor axis diameter) of 1 to 7, a bulk density of not less than 0.5 g/cm$^3$ and a powdering ratio of not more than 40%.

3. Granulated particles according to claim 2, wherein said granulated particles are particles which are used for producing magnetic iron based alloy particles by heat-treating the granulated particles in a reducing gas in a fixed-bed furnace, said particles having an average major axis diameter of 1 to 35 mm, an average minor axis diameter of 1 to 8.5 mm, an aspect ratio of 1 to 5, a bulk density of not less than 0.5 g/cm$^3$ and a powdering ratio of not more than 40%.

4. Granulated particles according to claim 1, wherein said granulated particles comprise acicular ferric oxide hydroxide particles or acicular hematite particles and at least one member selected from the group consisting of soluble starches, cationic starches, starches substituted with a carboxymethyl group or dialdehyde group, viscose and celluloses substituted with a methyl group, ethyl group, hydroxyl ether group or carboxyl group, in an amount not less than 0.1 part by weight and less than 5.0 parts by weight based on 100 parts by weight of the acicular ferric oxide hydroxide particles or acicular hematite particles;

said granulated particles having an average major axis diameter of 1 to 70 mm, an average minor axis diameter of 1 to 7 mm, an aspect ratio (average major axis diameter/average minor axis diameter) of 1 to 10, a bulk density of not less than 0.3 g/cm$^3$ and a powdering ratio of not more than 40%.

5. Granulated particles according to claim 1, wherein said acicular ferric oxide hydroxide particles or acicular iron oxide particles are particles having an average major axis diameter of 0.05 to 1.0 μm and an aspect ratio of not less than 3.

6. A process for producing granulated particles, comprising the steps of:

adding to a suspension composed of acicular ferric oxide hydroxide particles or acicular iron oxide particles and water, not less than 0.1 part by weight and less than 5.0 parts by weight of at least one member selected from the group consisting of soluble starches, Cationic starches, starches substituted with a carboxymethyl group or dialdehyde group, viscose and celluloses substituted with a methyl group, ethyl group, hydroxyl ether group or carboxyl group, based on 100 parts by weight of acicular ferric oxide hydroxide particles or acicular iron oxide particles in the suspension;

stirring the resultant suspension;

compressing and dehydrating the suspension to obtain a cake; and granulating the cake to obtain granulated particles for magnetic particles for magnetic recording, said particles comprising acicular ferric oxide hydroxide particles or acicular iron oxide particles and at least one member selected from the group consisting of soluble starches, cationic starches, starches substituted with a carboxymethyl group or dialdehyde group, viscose and celluloses substituted with a methyl group, ethyl group, hydroxyl ether group or carboxyl group, in an amount of not less than 0.1 part by weight and less than 5.0 parts by weight based on 100 parts by weight of the acicular ferric oxide hydroxide particles or acicular iron oxide particles, and having a bulk density of not less than 0.3 g/cm$^3$ and a powdering ratio of not more than 40%.

7. Magnetic iron based alloy particles for magnetic recording obtained by heat-treating at a temperature of 300° to 550° C. in a reducing gas the granulated particles as defined in claim 2 and subjecting the resulting particles to a surface-oxidizing treatment.

8. Magnetic iron based alloy particles for magnetic recording obtained by heat-treating at a temperature of 300° to 550° C. in a reducing gas the granulated particles as defined in claim 3 in a fixed-bed furnace and subjecting the resulting particles to surface-oxidizing treatment.

9. Magnetic iron oxide particles for magnetic recording obtained by heat-treating at a temperature of 300° to 550° C. in a reducing gas the granulated particles as defined in claim 4 in a fixed-bed furnace to produce magnetite particles.

10. Magnetic iron oxide particles for magnetic recording obtained by heat-treating at a temperature of 300° to 550° C. in a reducing gas granulated particles as defined in claim 4 in a fixed-bed furnace and oxidizing the heat-treated granulated particles at a temperature of 200° to 500° C. to produce maghemite particles.

11. Magnetic iron oxide particles for magnetic recording, obtained by dispersing as the precursor particles, the acicular magnetic iron oxide particles as defined in claim 9 or 10 in an alkali suspension containing cobalt hydroxide or an alkali suspension containing cobalt hydroxide and ferrous hydroxide and heat-treating the resultant dispersion at a temperature of 40° to 100° C., thereby obtaining acicular magnetite particles or acicular maghemite particles modified with Co or Co and $Fe^{2+}$.

12. Magnetic iron based alloy particles for magnetic recording according to claim 7 or 8, wherein the surface oxidizing treatment comprises immersing the obtained magnetic iron based alloy particles in an organic solvent.

13. Magnetic iron based alloy particles for magnetic recording according to claim 7 or 8, wherein the surface-oxidizing treatment comprises gradually oxidizing the atmosphere by replacing the atmosphere of the obtained magnetic iron based alloy particles with an inert gas and gradually increasing the oxygen content in the inert gas so that the final atmosphere is air.

14. Magnetic iron based alloy particles for magnetic recording according to claim 7 or 8, wherein said granulated particles are heat-treated at a temperature of 150° to 850° C.

15. Magnetic iron oxide particles for magnetic recording according to claim 9 or 10, wherein said granulated particles are heat-treated at a temperature of 150° to 850° C.

16. Magnetic iron based alloy particles for magnetic recording, obtained by heat-treating at a temperature of 300° to 550° C. in a reducing gas the granulated particles as defined in claim 1 and subjecting the obtained particles to surface-oxidizing treatment.

17. Magnetic iron oxide particles for magnetic recording, obtained by heat-treating at a temperature of 300° to 550° C. in a reducing gas the granulated particles as defined in claim 1 to produce magnetite particles.

18. Magnetic iron oxide particles for magnetic recording, obtained by heat-treating at a temperature of 300° to 550° C. in a reducing gas the granulated particles as defined in claim 1 and oxidizing the heat-treated granulated particles at a temperature of 200° to 500° C. to produce maghemite particles.

19. Magnetic iron oxide particles for magnetic recording, obtained by heat-treating at a temperature of 300° to 550° C. in a reducing gas the granulated particles as defined in claim 6 to produce magnetite particles.

20. Magnetic oxide particles for magnetic recording, obtained by heat-treating at a temperature of 300° to 550° C. in a reducing gas the granulated particles as defined in claim 4 and oxidizing the heat-treated granulated particles at a temperature of 200° to 500° C. to produce maghemite particles.

* * * * *